US012695970B2

(12) United States Patent
Hur et al.

(10) Patent No.: US 12,695,970 B2
(45) Date of Patent: Jul. 28, 2026

(54) CAMERA MODULE AND ELECTRONIC DEVICE COMPRISING SAME

(71) Applicant: Samsung Electronics Co., Ltd.,
Suwon-si (KR)

(72) Inventors: Dong Sung Hur, Suwon-si (KR);
Young Bok Yu, Suwon-si (KR);
Hyun-Ho Yu, Suwon-si (KR); Young Jae Hwang, Suwon-si (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 0 days.

(21) Appl. No.: 18/794,629

(22) Filed: Aug. 5, 2024

(65) Prior Publication Data

US 2024/0397181 A1     Nov. 28, 2024

Related U.S. Application Data

(63) Continuation of application No. PCT/KR2023/001570, filed on Feb. 3, 2023.

(30) Foreign Application Priority Data

Feb. 8, 2022     (KR) ........................ 10-2022-0015984
Mar. 23, 2022     (KR) ........................ 10-2022-0035939

(51) Int. Cl.
*H04N 23/55*          (2023.01)
*G03B 17/02*          (2021.01)
(52) U.S. Cl.
CPC ............. *H04N 23/55* (2023.01); *G03B 17/02* (2013.01)

(58) Field of Classification Search
CPC ................................ H04N 23/55; G03B 17/02
(Continued)

(56) References Cited

U.S. PATENT DOCUMENTS

| | | |
|---|---|---|
| 9,915,828 B2 | 3/2018 | Sul et al. |
| 10,725,313 B2 | 7/2020 | Sugawara |

(Continued)

FOREIGN PATENT DOCUMENTS

| | | |
|---|---|---|
| KR | 10-2015-0054058 A | 5/2015 |
| KR | 10-2015-0058784 A | 5/2015 |

(Continued)

OTHER PUBLICATIONS

International Search Report dated May 10, 2023, issued in International Application No. PCT/KR2023/001570.
(Continued)

*Primary Examiner* — Joel W Fosselman
(74) *Attorney, Agent, or Firm* — Jefferson IP Law, LLP

(57)          ABSTRACT

A camera module includes an optical assembly, a first actuator configured to actuate the optical assembly in a first direction, the first actuator including a first carrier, a guide configured to guide the first carrier, and a shock absorber provided in the first carrier and configured to reduce a shock transmitted to the guide, and a second actuator configured to actuate the optical assembly in a second direction different from the first direction, the second actuator including a second carrier spaced apart from the first carrier, and a stopper provided in the second carrier and configured to restrict a movement of the second carrier, wherein the shock absorber is provided between the guide and the stopper.

20 Claims, 12 Drawing Sheets

(58) Field of Classification Search
USPC ..................................................... 348/207.99
See application file for complete search history.

(56) References Cited

U.S. PATENT DOCUMENTS

| | | | |
|---|---|---|---|
| 2015/0296143 A1* | 10/2015 | Kang ........................ | G03B 3/10 |
| | | | 348/208.11 |
| 2016/0238856 A1 | 8/2016 | Sul et al. | |
| 2020/0033556 A1 | 1/2020 | Huang et al. | |
| 2021/0033818 A1 | 2/2021 | Chen et al. | |

FOREIGN PATENT DOCUMENTS

| | | |
|---|---|---|
| KR | 10-1600574 B1 | 3/2016 |
| KR | 10-2016-0148281 A | 12/2016 |
| KR | 10-1960493 B1 | 7/2019 |
| KR | 10-2166262 B1 | 10/2020 |
| KR | 10-2166329 B1 | 10/2020 |
| KR | 10-2021-0073436 A | 6/2021 |
| KR | 10-2021-0114748 A | 9/2021 |
| KR | 10-2021-0117507 A | 9/2021 |
| KR | 10-2022-0013333 A | 2/2022 |
| WO | 2022/149737 A1 | 7/2022 |

OTHER PUBLICATIONS

European Search Report dated Jul. 18, 2024 , issued in European
Application No. 23717009.7.

* cited by examiner

CAMERA MODULE AND ELECTRONIC DEVICE COMPRISING SAME

CROSS-REFERENCE TO RELATED APPLICATION(S)

This application is a continuation application, claiming priority under § 365(c), of an International application No. PCT/KR2023/001570, filed on Feb. 3, 2023, which is based on and claims the benefit of a Korean patent application number 10-2022-0015984, filed on Feb. 8, 2022, in the Korean Intellectual Property Office, and of a Korean patent application number 10-2022-0035939, filed on Mar. 23, 2022, in the Korean Intellectual Property Office, the disclosure of each of which is incorporated by reference herein in its entirety.

BACKGROUND

1. Technical Field

The disclosure relates to a camera module and an electronic device including the same.

2. Description of Related Art

A camera module may include an optical image stabilizer and an autofocus device. As an example, the optical image stabilizer and the autofocus device may be configured to slide by ball bearings. As another example, the optical image stabilizer may be configured to be actuated by a suspension wire while the autofocus device may be configured to be guided by a spring.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a camera module.

According to one embodiment, a camera module includes an optical assembly, a first actuator configured to actuate the optical assembly in a first direction, the first actuator including a first carrier, a guide configured to guide the first carrier, and a shock absorber provided in the first carrier and configured to reduce a shock transmitted to the guide, and a second actuator configured to actuate the optical assembly in a second direction different from the first direction, the second actuator including a second carrier spaced apart from the first carrier, and a stopper provided in the second carrier and configured to restrict a movement of the second carrier, wherein the shock absorber may be provided between the guide and the stopper.

According to one embodiment, an electronic device includes a housing and a camera module positioned in the housing, wherein the camera module includes an optical assembly, a first actuator configured to actuate the optical assembly in a first direction, the first actuator including a first carrier, a guide configured to guide the first carrier, and a shock absorber provided in the first carrier and configured to reduce a shock transmitted to the guide, and a second actuator configured to actuate the optical assembly in a second direction different from the first direction, the second actuator including a second carrier spaced apart from the first carrier, and a stopper provided in the second carrier and configured to restrict a movement of the second carrier, wherein the shock absorber may be provided between the guide and the stopper.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

The same reference numerals are used to represent the same elements throughout the drawings.

DETAILED DESCRIPTION

Figure 1:
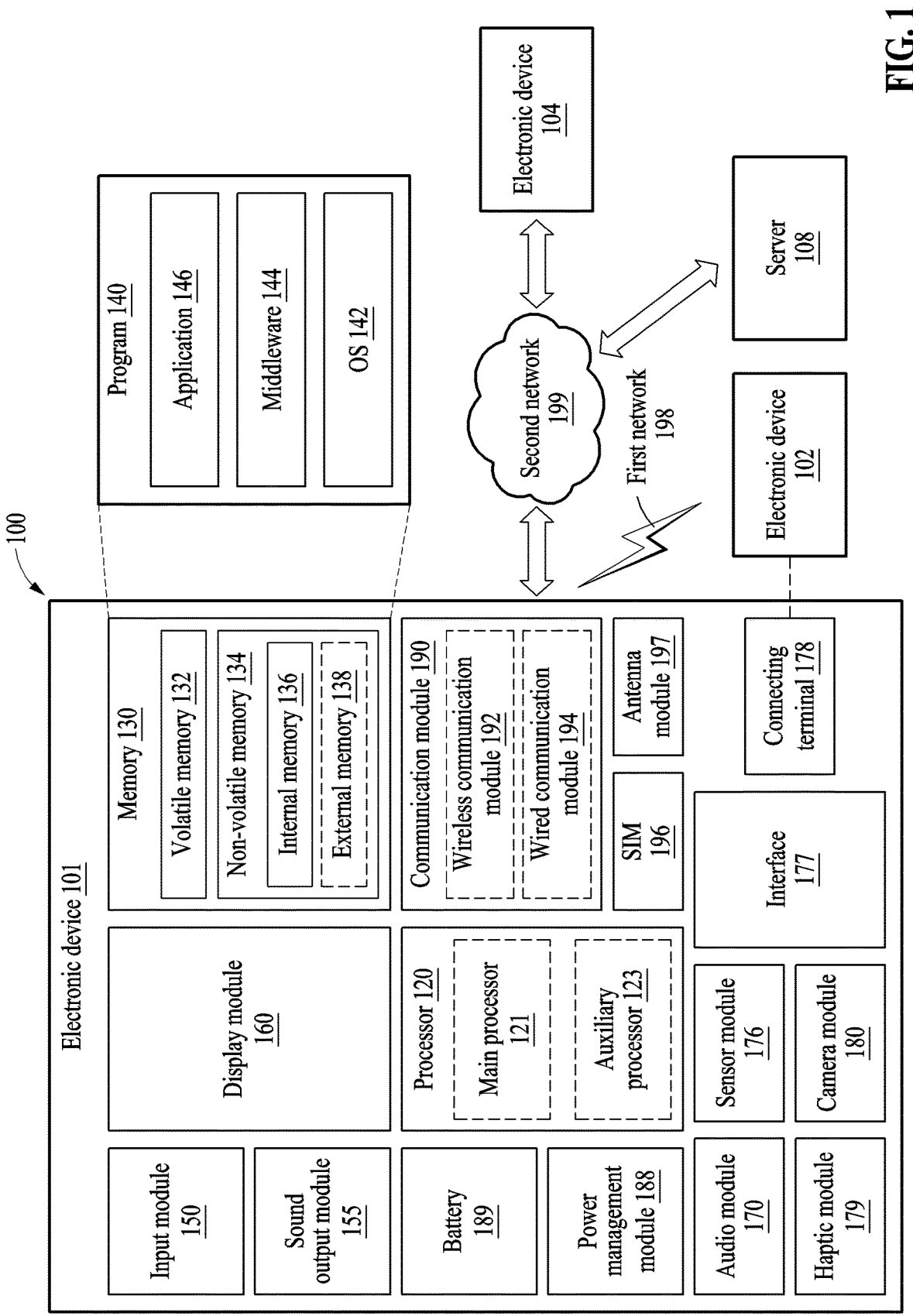
FIG. 1 is a block diagram illustrating an electronic device in a network environment according to one embodiment.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a micropro-cessor unit (MPU), a system on chip (SoC), an IC, or the like.

FIG. 1 is a block diagram illustrating an electronic device in a network environment according to one embodiment.

Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to one embodiment, the electronic device 101 may communicate with the electronic device 104 via the server 108. According to one embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to one embodiment, as at least a portion of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to one embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a portion of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to one embodiment, the auxiliary processor 123 (e.g., an ISP or a CP) may be implemented as a portion of another component (e.g., the camera module 180 or the communication module 190) that is functionally related to the auxiliary processor 123. According to one embodiment, the auxiliary processor 123 (e.g., an NPU) may include a hardware structure specified for artificial intelligence (AI) model processing. An AI model may be generated by machine learning. Such learning may be performed by, for example, the electronic device 101 in which an artificial intelligence model is executed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to one embodiment, the receiver may be implemented separately from the speaker or as a portion of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to one embodiment, the display module 160 may include a touch sensor adapted to sense a touch, or a pressure sensor adapted to measure an intensity of a force incurred by the touch.

The audio module 170 may convert a sound into an electrical signal or vice versa. According to one embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to one embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to one embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to one embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to one embodiment, the haptic module 179 may include, for example, a motor, a piezoelectric element, or an electric stimulator.

The camera module 180 may capture a still image and moving images. According to one embodiment, the camera module 180 may include one or more lenses, image sensors, ISPs, or flashes.

The power management module 188 may manage power supplied to the electronic device 101. According to one embodiment, the power management module 188 may be implemented as, for example, at least a portion of a power management integrated circuit (PMIC).

The battery 189 may supply power to at least one component of the electronic device 101. According to one embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to one embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to one embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to one embodiment, the antenna module 197 may include an antenna including a radiating element including a conductive material or a conductive pattern formed in or on a substrate (e.g., a printed circuit board (PCB)). According to one embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to one embodiment, another component (e.g., a radio frequency integrated circuit (RFIC)) other than the radiating element may be additionally formed as a portion of the antenna module 197.

According to one embodiment, the antenna module 197 may form a mmWave antenna module. According to one embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to one embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least portion of the function or the service. The one or more external electronic devices receiving the request may perform the at least portion of the function or the service requested, or an additional function or an additional service related to the request, and may transfer an outcome of the performing to the electronic device 101. The electronic device 101 may provide the outcome, with or without further processing of the outcome, as at least portion of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In one embodiment, the external electronic device 104 may include an Internet-of-things (IoT) device. The server 108 may be an intelligent server using machine learning and/or a neural network. According to one embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to one embodiment may be one of various types of electronic devices. The electronic device may include, for example, a portable communication device (e.g., a smart phone), a computer device, a portable multimedia device, a portable medical device, a camera, a wearable device, or a home appliance device. According to one embodiment of the disclosure, the electronic device is not limited to those described above.

It should be appreciated that embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C", each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with an embodiment of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to one embodiment, the module may be implemented in a form of an application-specific integrated circuit (ASIC).

An embodiment as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method according to one embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least portion of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities, and some of the multiple entities may be separately disposed in different components. According to one embodiment, one or more of the above-described components may be omitted, or one or more other components may be added. Alternatively or additionally, a plurality of components (e.g., modules or programs) may be integrated into a single component. In such a case, according to one embodiment, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

Figure 2A:
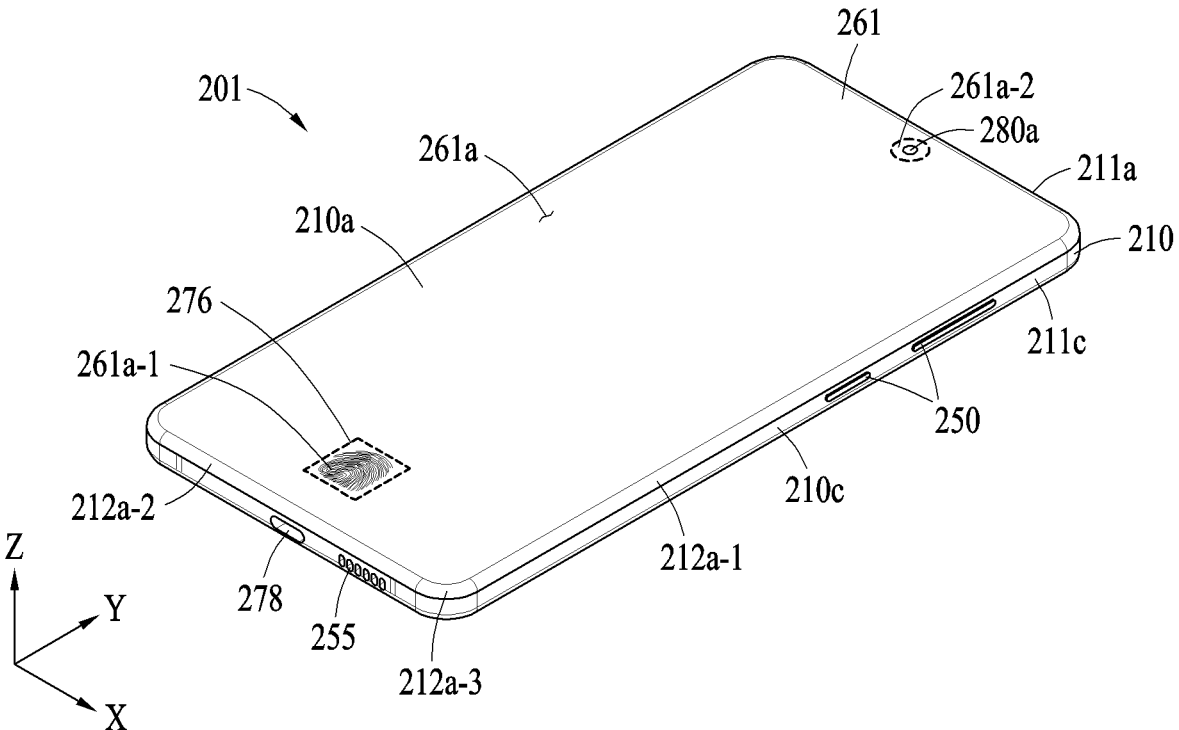
FIG. 2A is a perspective view of an electronic device viewed in one direction according to one embodiment.
Figure 2B:
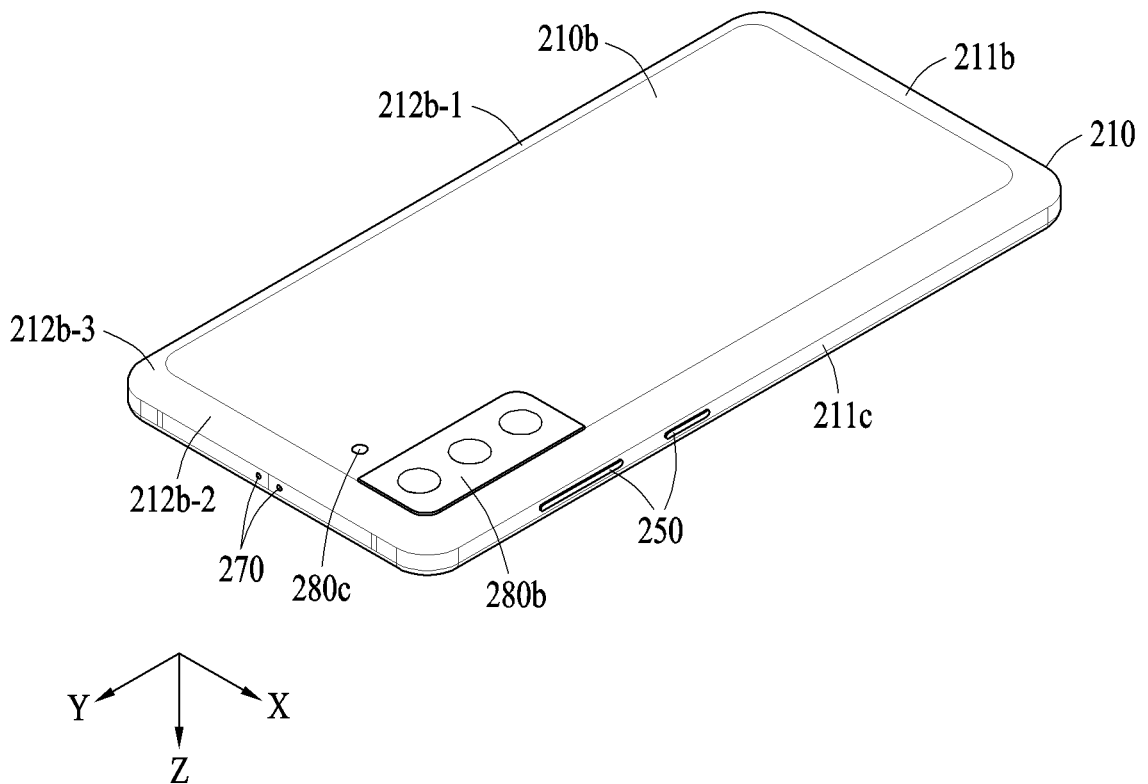
FIG. 2B is a perspective view of an electronic device viewed in another direction according to one embodiment.
Figure 2C:
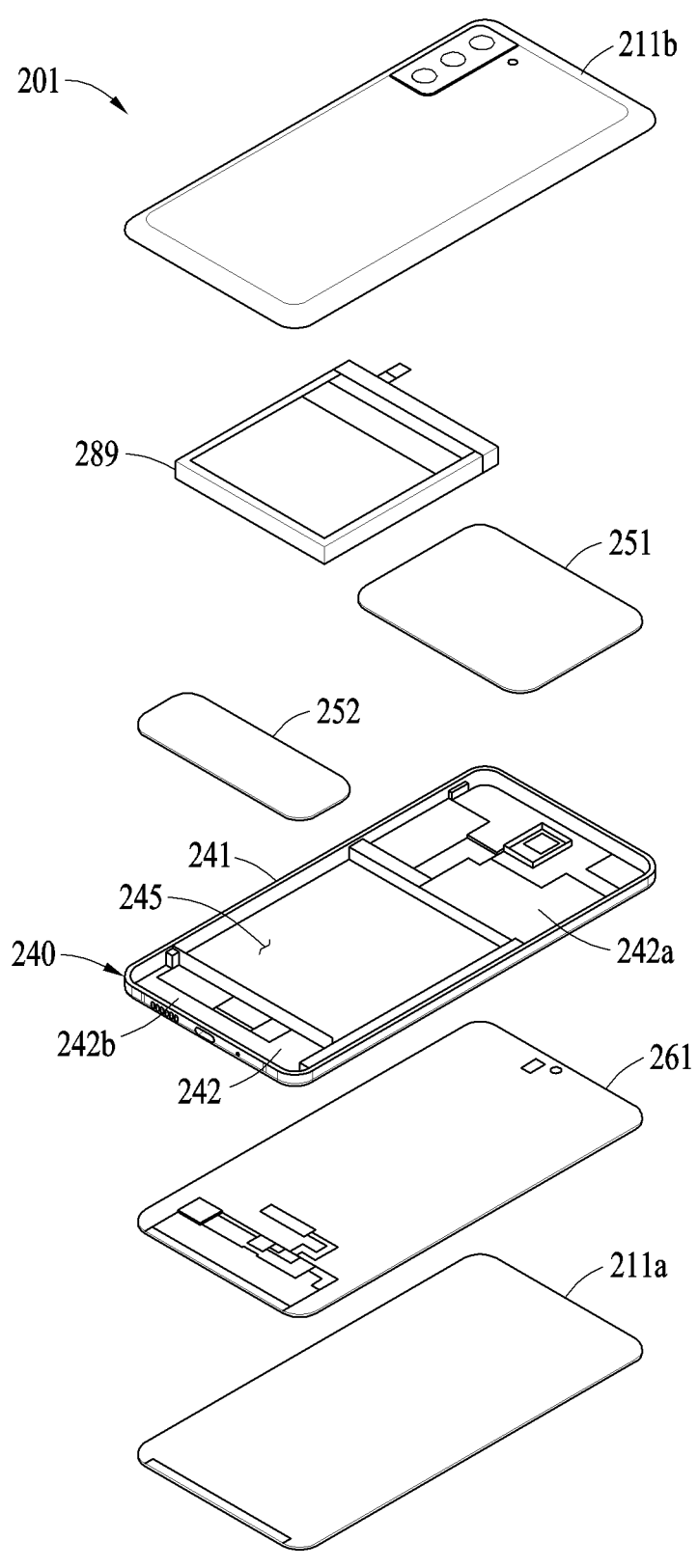
FIG. 2C is an exploded perspective view of an electronic device according to one embodiment.

FIG. 2A is a perspective view of an electronic device viewed in one direction according to one embodiment. FIG. 2B is a perspective view of an electronic device viewed in another direction according to one embodiment. FIG. 2C is an exploded perspective view of an electronic device according to one embodiment.

Referring to FIGS. 2A to 2C, an electronic device 201 (e.g., the electronic device 101 of FIG. 1) may include a housing 210 including a first surface 210*a* (e.g., a front surface), a second surface 210*b* (e.g., a rear surface), and a third surface 210*c* (e.g., a side surface) enclosing a space between the first surface 210*a* and the second surface 210*b*.

In one embodiment, the first surface 210*a* may be formed by a first plate 211*a* of which at least a portion is substantially transparent. For example, the first plate 211*a* may include a polymer plate or a glass plate including at least one coating layer. The second surface 210*b* may be formed by a second plate 211*b* that is substantially opaque. For example, the second plate 211*b* may be formed of coated or tinted glass, ceramic, polymer, metal (e.g., aluminum, stainless steel (STS), or magnesium), or a combination thereof. The third surface 210*c* may be formed by a frame 211*c* that is coupled to the first plate 211*a* and the second plate 211*b* and includes a metal and/or a polymer. In one embodiment, the second plate 211*b* and the frame 211*c* may be integrally and seamlessly formed. In one embodiment, the second plate 211*b* and the frame 211*c* may be formed of substantially the same material (e.g., aluminum).

In one embodiment, the first plate 211*a* may include a plurality of first periphery areas 212*a*-1 that are rounded in a direction from at least one area of the first surface 210*a* toward the second plate 211*b* and extend in one direction (e.g., a +/−Y direction), a plurality of second periphery areas 212*a*-2 that are rounded in the direction from at least one area of the first surface 210*a* toward the second plate 211*b* and extend in the other direction (e.g., a +/−X direction), and a plurality of third periphery areas 212*a*-3 that are rounded in the direction from at least one area of the first surface 210*a* toward the second plate 211*b* and positioned between the plurality of first periphery areas 212*a*-1 and the plurality of second periphery areas 212*a*-2. In one embodiment, the second plate 211*b* may include a plurality of fourth periphery areas 212*b*-1 that are rounded in a direction from at least one area of the second surface 210*b* toward the first plate 211*a* and extend in one direction (e.g., the +/−Y direction), a plurality of fifth periphery areas 212*b*-2 that are rounded in the direction from at least one area of the second surface 210*b* toward the first plate 211*a* and extend in the other direction (e.g., the +/−X direction), and a plurality of sixth periphery areas 212*b*-3 that are rounded in the direction from at least one area of the second surface 210*b* toward the first plate 211*a* and positioned between the plurality of fourth periphery areas 212*b*-1 and the plurality of fifth periphery areas 212*b*-2.

The electronic device 201 may include a display 261 (e.g., the display module 160). In one embodiment, the display 261 may be positioned on the first surface 210*a*. In one embodiment, the display 261 may be exposed through at least a portion (e.g., the plurality of first periphery areas 212*a*-1, the plurality of second periphery areas 212*a*-2, and the plurality of third periphery areas 212*a*-3) of the first plate 211*a*. In one embodiment, the display 261 may have a shape that is substantially the same as the shape of an outer edge of the first plate 211*a*. In some embodiments, the periphery of the display 261 may substantially coincide with the outer edge of the first plate 211*a*. In one embodiment, the display 261 may include a touch sensing circuit, a pressure sensor for measuring an intensity (pressure) of a touch, and/or a digitizer for detecting a magnetic-type stylus pen. In one embodiment, the display 261 may include a screen display area 261*a* that is visually exposed to display content using pixels. In one embodiment, the screen display area 261*a* may include a sensing area 261*a*-1 and/or a camera area 261*a*-2. The sensing area 261*a*-1 may overlap at least one area of the screen display area 261*a*. The sensing area 261*a*-1 may allow transmission of an input signal related to a sensor module 276 (e.g., the sensor module 176). The sensing area 261*a*-1 may display content, like the screen display area 261*a* that does not overlap the sensing area 261*a*-1. For example, the sensing area 261*a*-1 may display the content while the sensor module 276 is not operating. The camera area 261*a*-2 may overlap at least one area of the screen display area 261*a*. The camera area 261*a*-2 may allow transmission of an optical signal related to a first camera module 280*a* (e.g., the camera module 180). The camera area 261*a*-2 may display content, like the screen display area 261*a* that does not overlap the camera area 261*a*-2. For example, the camera area 261*a*-2 may display the content while the first camera module 280*a* is not operating.

The electronic device 201 may include an audio module 270 (e.g., the audio module 170). In one embodiment, the haptic module 270 may be positioned on the third surface 210*c*. In one embodiment, the audio module 270 may obtain a sound through at least one hole.

The electronic device 201 may include the sensor module 276. In one embodiment, the sensor module 276 may be positioned on the first surface 210*a*. The sensor module 276 may form the sensing area 261*a*-1 in at least a portion of the screen display area 261*a*. The sensor module 276 may receive an input signal transmitted through the sensing area 261*a*-1 and generate an electrical signal based on the received input signal. As an example, the input signal may have a designated physical quantity (e.g., heat, light, temperature, sound, pressure, or ultrasound). As another example, the input signal may include a signal related to biometric information (e.g., a fingerprint) of a user.

The electronic device 201 may include the first camera module 280*a*, a second camera module 280*b* (e.g., the camera module 180), and a flash 280*c*. In one embodiment, the first camera module 280*a* may be positioned on the first surface 210*a*, and the second camera module 280*b* and the flash 280*c* may be positioned on the second surface 210*b*. In one embodiment, at least a portion of the first camera module 280*a* may be positioned under the display 261. In one embodiment, the first camera module 280*a* may receive an optical signal transmitted through the camera area 261*a*-2. In one embodiment, the second camera module 280*b* may include a plurality of camera modules (e.g., a dual camera, a triple camera, or a quad camera). In one embodiment, the flash 280*c* may include a light-emitting diode or a xenon lamp.

The electronic device 201 may include a sound output module 255 (e.g., the sound output module 155). In one embodiment, the sound output module 255 may be positioned on the third surface 210*c*. In one embodiment, the sound output module 255 may include one or more holes.

The electronic device 201 may include an input module 250 (e.g., the input module 150). In one embodiment, the input module 250 may be positioned on the third surface 210*c*. In one embodiment, the input module 250 may include at least one key input device.

The electronic device 201 may include a connecting terminal 278 (e.g., the connecting terminal 178). In one embodiment, the connecting terminal 278 may be positioned on the third surface 210*c*. For example, when the electronic device 201 is viewed in one direction (e.g., the +Y direction), the connecting terminal 278 may be positioned at a central portion of the third surface 210*c*, and the sound output module 255 may be positioned on one side (e.g., a right side) with respect to the connecting terminal 278.

The electronic device 201 may include a support body 240, a first circuit board 251, a second circuit board 252, and a battery 289 (e.g., the battery 189). At least a portion of the support body 240 may form the housing 210 together with the first plate 211*a* and the second plate 211*b*. In one embodiment, the support body 240 may include a frame structure 241 (e.g., the frame 211*c*) and a plate structure 242. The frame structure 241 may be formed to surround a periphery of the plate structure 242. The frame structure 241 may connect a periphery of the first plate 211*a* and a periphery of the second plate 211*b*, surround the space between the first plate 211*a* and the second plate 211*b*, and form the third surface 210*c* of the electronic device 201. The plate structure 242 may include a first portion 242*a* for accommodating the first circuit board 251 and a second portion 242*b* for accommodating the second circuit board 252. The display 261 may be positioned on one surface (e.g., a bottom surface) of the plate structure 242, and the first circuit board 251 and the second circuit board 252 may be positioned on the other surface (e.g., a top surface) of the plate structure 242. In one embodiment, the plate structure 242 may include an opening 245 positioned between the first portion 242*a* and the second portion 242*b* and passing through both surfaces of the plate structure 242. The opening 245 may at least partially accommodate the battery 289.

Meanwhile, the description provided herein may also apply to electronic devices of various shapes/forms (e.g., a foldable electronic device, a slidable electronic device, a digital camera, a digital video camera, a tablet PC, a laptop computer, and other electronic devices), in addition to the electronic device shown in FIGS. 2A to 2C.

Figure 3:
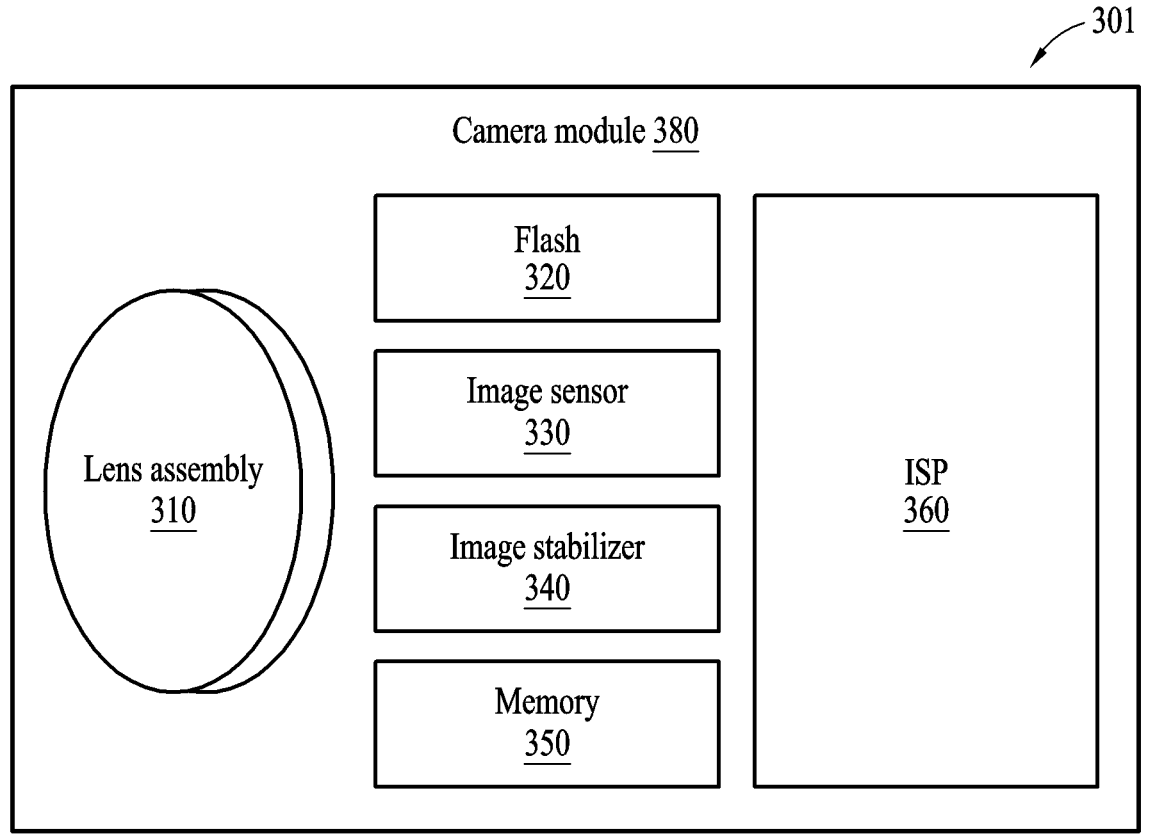
FIG. 3 is a block diagram illustrating a camera module according to one embodiment.

FIG. 3 is a block diagram illustrating a camera module according to one embodiment.

Referring to FIG. 3, a camera module 380 (e.g., the camera module 180, the first camera module 280*a*, and/or the second camera module 280*b*) may include a lens assembly 310, a flash 320, an image sensor 330, an image stabilizer 340, a memory 350 (e.g., a buffer memory), or an image signal processor (ISP) 360. The lens assembly 310 may collect light emitted from an object which is a target of which an image is to be captured. The lens assembly 310 may include one or more lenses. According to one embodiment, the camera module 380 may include a plurality of lens assemblies 310. In this case, the camera module 380 may constitute, for example, a dual camera, a 360-degree camera, or a spherical camera. A portion of the lens assemblies 310 may have the same lens properties (e.g., an angle of view, a focal length, an auto focus, an f number, or an optical zoom), or at least one of the lens assemblies 310 may have one or more lens properties that are different from those of other lens assemblies. The lens assembly 310 may include, for example, a wide-angle lens or a telephoto lens.

The flash 320 may emit light to be used to enhance light emitted or reflected from the object. According to one embodiment, the flash 320 may include one or more light emitting diodes (LEDs) (e.g., a red-green-blue (RGB) LED, a white LED, an infrared (IR) LED, or an ultraviolet (UV) LED), or a xenon lamp. The image sensor 330 may obtain an image corresponding to the object by converting light emitted or reflected from the object and transmitted through the lens assembly 310 into an electrical signal. According to one embodiment, the image sensor 330 may include, for example, one image sensor selected from among image sensors having different properties, such as, for example, an RGB sensor, a black and white (BW) sensor, an IR sensor, or a UV sensor, a plurality of image sensors having the same property, or a plurality of image sensors having different properties. Each image sensor included in the image sensor 330 may be implemented using, for example, a charged coupled device (CCD) sensor or a complementary metal-oxide-semiconductor (CMOS) sensor.

The image stabilizer 340 may move at least one lens included in the lens assembly 310 or the image sensor 330 in a specific direction, or control an operation characteristic (e.g., adjust the read-out timing) of the image sensor 330, in response to a movement of the camera module 380 or an electronic device 301 including the camera module 380. This may compensate for at least a portion of a negative effect of the movement on an image to be captured. According to one embodiment, the image stabilizer 340 may sense such a movement of the camera module 380 or the electronic device 301 using a gyro sensor (not shown) or an acceleration sensor (not shown) disposed inside or outside the camera module 380. According to one embodiment, the image stabilizer 340 may be implemented as, for example, an optical image stabilizer. The memory 350 may temporarily store therein at least a portion of the image obtained through the image sensor 330 for a subsequent image processing operation. For example, when image acquisition is delayed by a shutter or a plurality of images is obtained at a high speed, an obtained original image (e.g., a Bayer-patterned image or a high-resolution image) may be stored in the memory 350 and a copy image (e.g., a low-resolution image) corresponding the original image may be previewed through a display module 160. Subsequently, when a specified condition (e.g., a user input or a system command) is satisfied, at least a portion of the original image stored in the memory 350 may be obtained and processed by, for example, the ISP 360. According to one embodiment, the memory 350 may be configured as at least a part of the memory 130 or as a separate memory operated independently of the memory 130.

The ISP 360 may perform one or more image processing operations on an image obtained through the image sensor 330 or an image stored in the memory 350. The image processing operations may include, for example, depth map generation, three-dimensional (3D) modeling, panorama generation, feature point extraction, image synthesis, or image compensation (e.g., noise reduction, resolution adjustment, brightness adjustment, blurring, sharpening, or softening. Additionally or alternatively, the ISP 360 may control at least one of the components (e.g., the image sensor 330) included in the camera module 380. For example, the ISP 360 may control an exposure time, a read-out timing, and the like. The image processed by the ISP 360 may be stored again in the memory 350 for further processing, or be provided to an external component (e.g., the memory 130, the display module 160, an electronic device 102, an electronic device 104, or a server 108) of the camera module 380. According to one embodiment, the ISP 360 may be configured as at least a part of a processor 120 or as a separate processor operated independently of the processor 120. When the ISP 360 is configured as a processor separate from the processor 120, at least one image processed by the ISP 360 may be displayed as it is without a change or be displayed through the display module 160 after additional image processing is performed by the processor 120.

According to one embodiment, the electronic device 301 may include a plurality of camera modules 380 having different properties or functions. In this case, for example, at least one of the camera modules 380 may be a wide-angle camera, and at least another one of the camera modules 380 may be a telephoto camera. Similarly, at least one of the camera modules 380 may be a front camera, and at least another one of the camera modules 380 may be a rear camera.

Figure 4A:
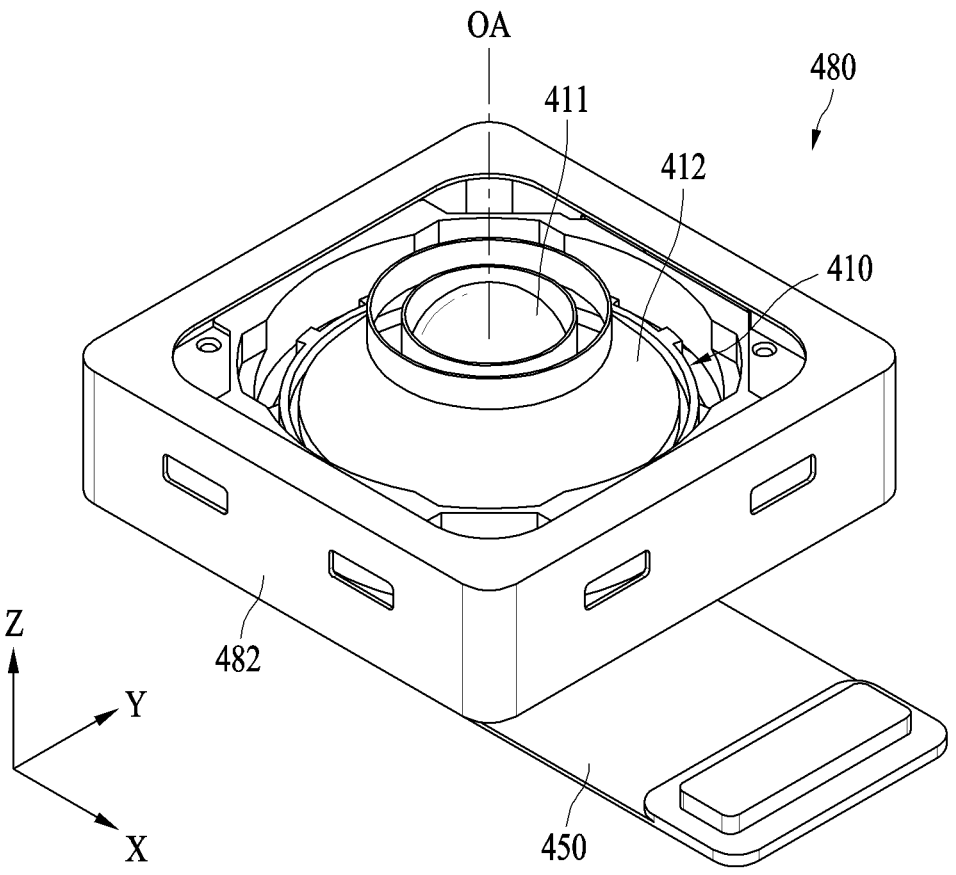
FIG. 4A is a perspective view of a camera module according to one embodiment.
Figure 4B:
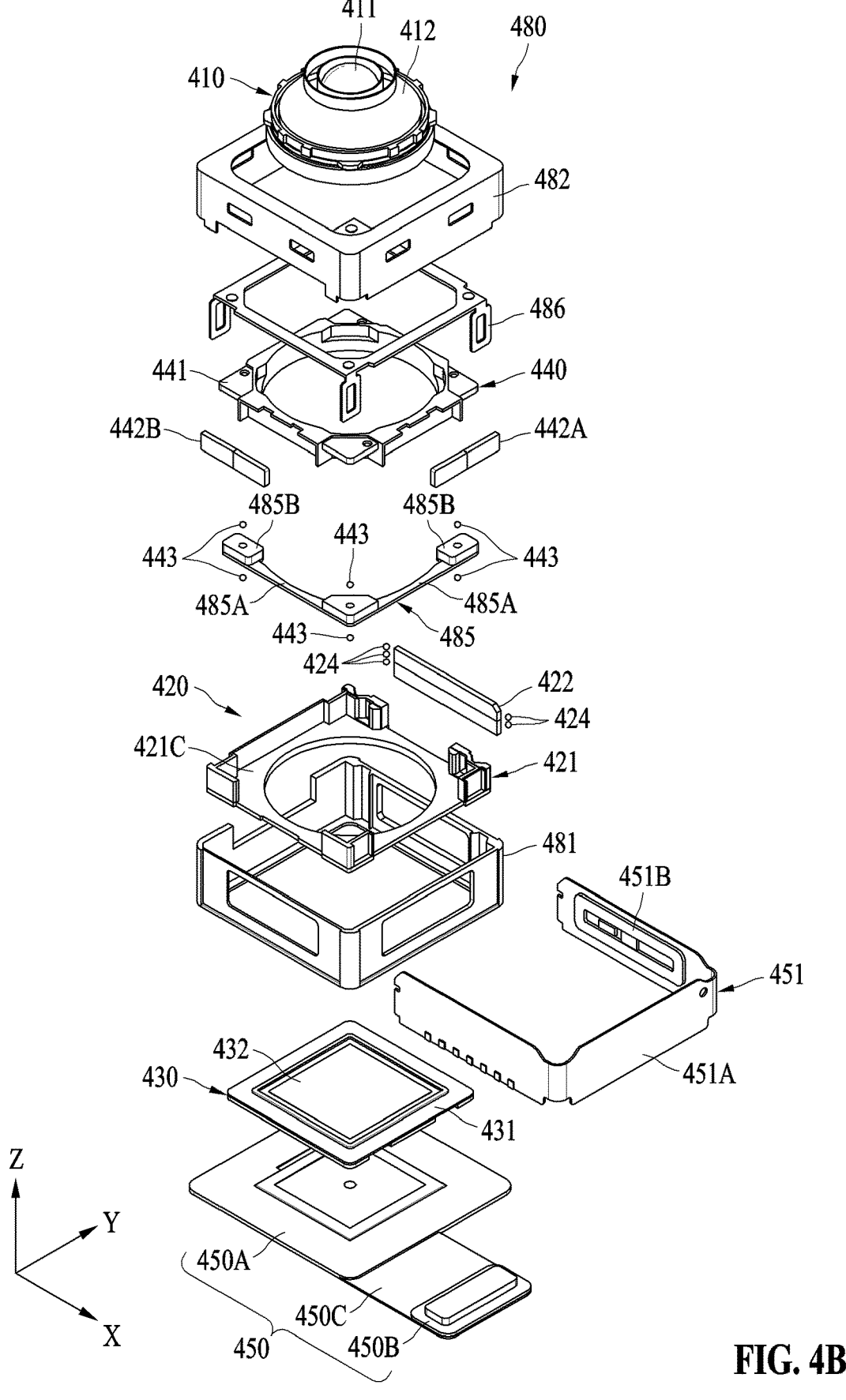
FIG. 4B is an exploded perspective view of a camera module according to one embodiment.
Figure 4C:
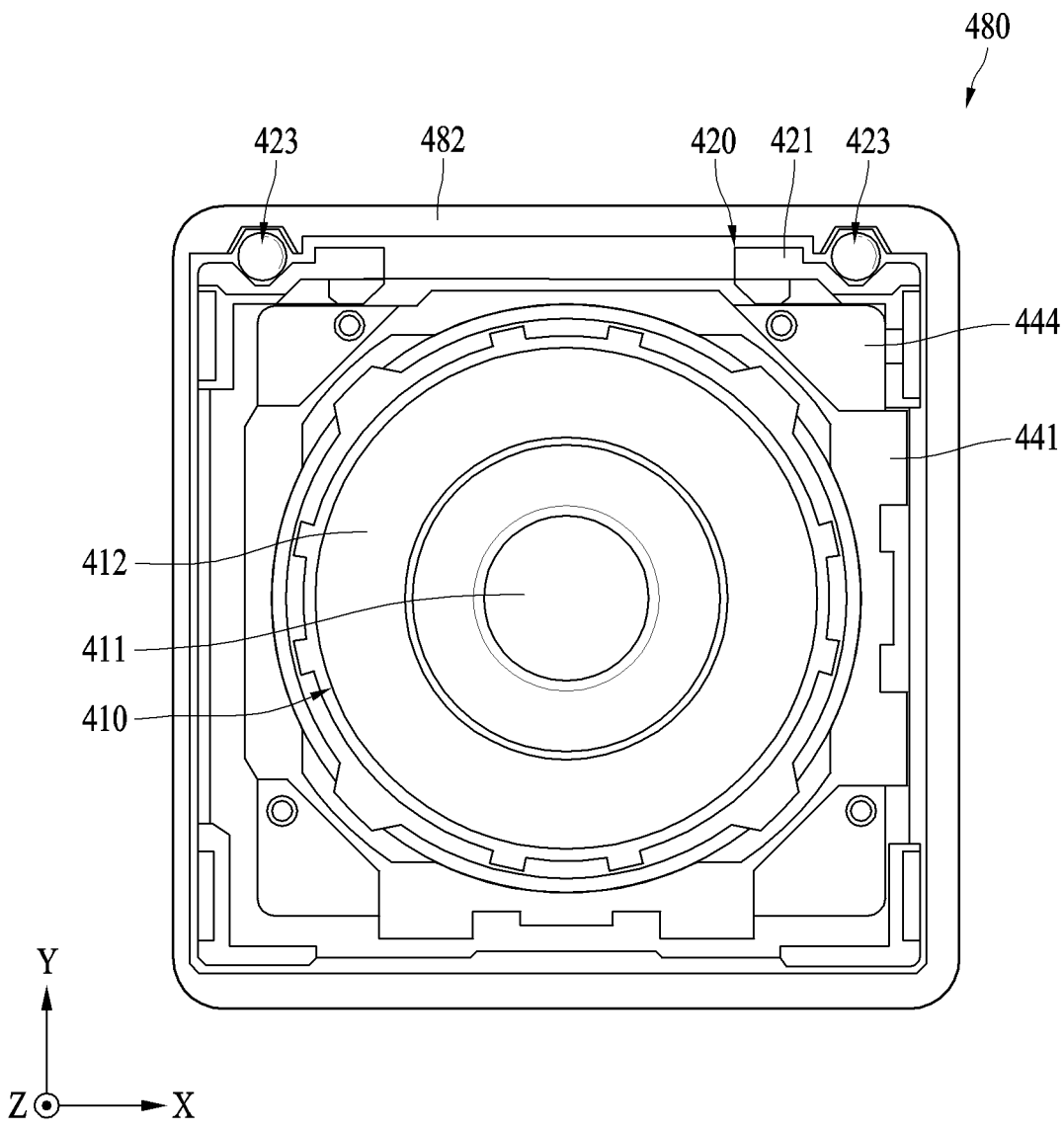
FIG. 4C is a plan view of a camera module according to one embodiment.
Figure 4D:
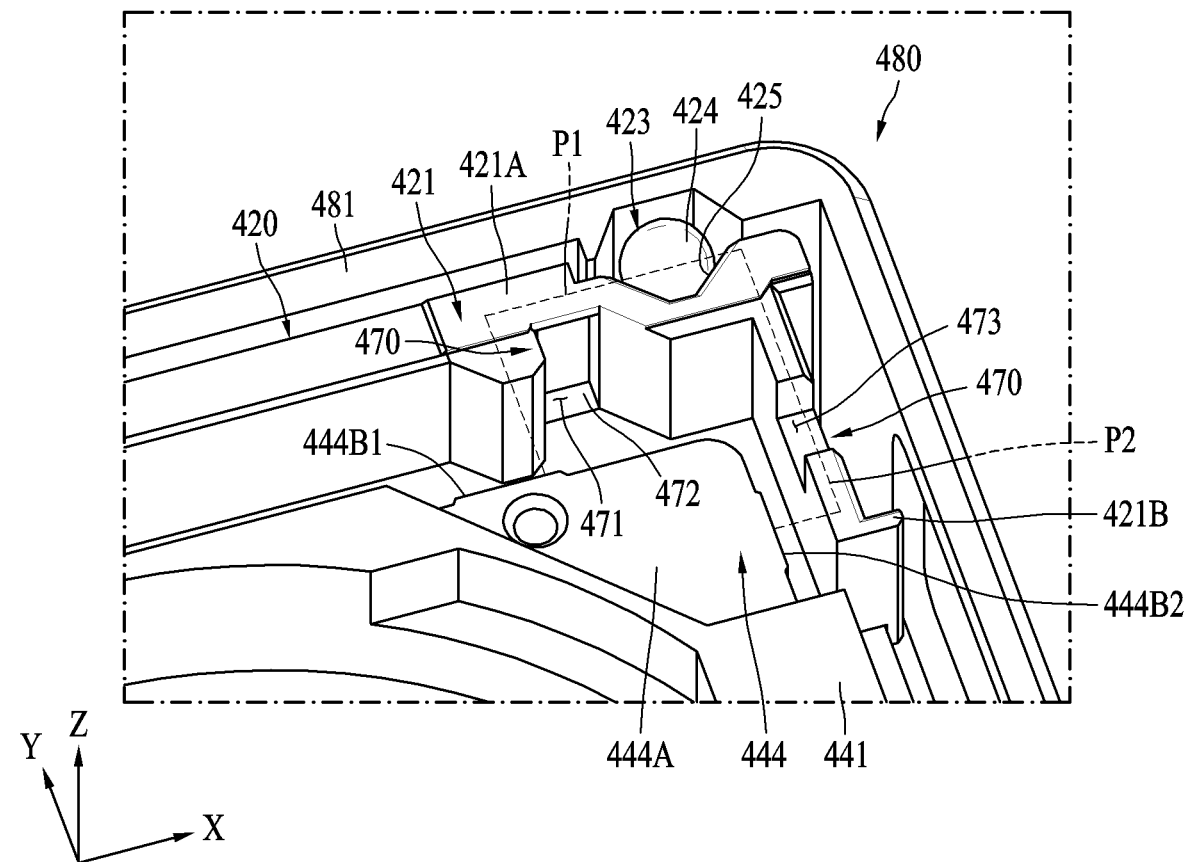
FIG. 4D is an enlarged view of a portion of the camera module of FIG. 4C.

FIG. 4A is a perspective view of a camera module according to one embodiment. FIG. 4B is an exploded perspective view of a camera module according to one embodiment. FIG. 4C is a plan view of a camera module according to one embodiment. FIG. 4D is an enlarged view of a portion of the camera module of FIG. 4C.

Referring to FIGS. 4A to 4D, a camera module 480 (e.g., the camera module 180, 280a, 280b, 380) may include an optical assembly 410 (e.g., the lens assembly 310), a first actuator 420, a sensor assembly 430, a second actuator 440 (e.g., the image stabilizer 340), a PCB 450, a flexible printed circuit board (FPCB) 451, a first camera housing 481, and a second camera housing 482.

The optical assembly 410 may include a lens 411 having an optical axis OA, and a lens barrel 412 at least partially surrounding the lens 411.

The first actuator 420 may include a first carrier 421 that accompanies the lens 411 and the lens barrel 412 and is positioned inside the first camera housing 481, a first magnet 422 positioned on one surface (e.g., a side surface) of the first carrier 421, and a guide 423 configured to guide the first carrier 421 to move the lens 411 and the lens barrel 412 in one direction (e.g., a direction substantially parallel to the optical axis OA, +/−Z direction).

In one embodiment, the first carrier 421 may include a first base 421C, a first carrier wall 421A positioned on the first base 421C and at least partially extending along one edge of the first base 421C in a first direction (e.g., +/−X direction), and a second carrier wall 421B positioned on the first base 421C and at least partially extending along the other edge of the first base 421C in a second direction (e.g., +/−Y direction) intersecting with the first direction. The first carrier wall 421A and the second carrier wall 421B may meet each other in a corner area of the first base 421C.

In one embodiment, the first magnet 422 may be positioned on one surface (e.g., an open side surface) of the first carrier 421. The first magnet 422 may be positioned between adjacent corner areas on the first base 421C.

In one embodiment not shown, the first actuator 420 may include a magnetic sensor positioned between the first camera housing 481 and the first carrier 421. For example, the magnetic sensor may include a Hall sensor. In one embodiment, the magnetic sensor may be positioned on the first magnet 422. In one embodiment, the magnetic sensor may be positioned in a space (e.g., a central portion) surrounded by at least one coil 451B.

In one embodiment, the first actuator 420 may include a plurality of magnets 422 respectively positioned on one surface (e.g., a surface in the +/−X direction) and/or the other side (e.g., a surface in the +/−Y direction) of the first carrier 421.

In one embodiment, the first carrier 421 and the first camera housing 481 may define the guide 423 together. For example, the guide 423 may include at least one first ball 424, and a guide rail 425 configured such that the at least one first ball 424 passes along.

In one embodiment, the guide 423 may include a plurality of (e.g., five) first balls 424. In some embodiments, the guide 423 may include a first set of a plurality of (e.g., two) first balls 424 in one corner area of the first base 421C, and a second set of a plurality of (e.g., three) first balls 424 in the other corner area of the first base 421C.

In one embodiment, the guide rail 425 may be provided on a surface (e.g., a side surface) facing the first camera housing 481. The guide rail 425 may be implemented as a recessed structure having any shape appropriate for receiving the at least one first ball 424. For example, the guide rail 425 may have a plurality of contact surfaces in rolling contact with the at least one first ball 424. The plurality of contact surfaces may form a recessed structure having a substantially polygonal cross-section.

The sensor assembly 430 may include a circuit board 431 and an image sensor 432 (e.g., the image sensor 330) positioned on the circuit board 431. The image sensor 432 may be positioned to be substantially aligned with the optical axis OA of the lens 411.

The second actuator 440 may include a second carrier 441, a second magnet 442A positioned on one surface (e.g., a surface in the +/−X direction) of the second carrier 441, a third magnet 442B positioned on the other surface (e.g., a surface in the +/−Y direction) of the second carrier 441, a plurality of second balls 443 configured to guide a movement (e.g., a movement in the +/−X direction and/or a movement in the +/Y direction) of the second carrier 441, and a plurality of stoppers 444 configured to restrict a movement (e.g., a movement in the +/−X direction and/or a movement in the +/Y direction) of the second carrier 441.

In one embodiment, the plurality of stoppers 444 may include stopper bases 444A positioned in corner areas of the second carrier 441, first stopping portions 444B1 facing the first carrier wall 421A, protruding from one surfaces (e.g., first stopper side surfaces in the +Y direction) of the stopper bases 444A, and configured to contact at least a portion of the first carrier wall 421A, and second stopping portions 444B2 protruding from the other surfaces (e.g., second stopper side surfaces in the +X direction intersecting with the first stopper side surfaces) of the stopper bases 444A and configured to contact at least a portion of the second carrier wall 421B.

In one embodiment, the stopper bases 444A may be positioned to be spaced apart from the guide 423. The spaced structure of the stopper bases 444A and the guide 423 may reduce or prevent the first stopping portion 444B1 and the second stopping portion 444B2 from directly striking the guide 423.

The PCB 450 may be configured to connect the circuit board 431 and another component (e.g., the first circuit board 251 of FIG. 2C). The PCB 450 may include a board area 450A connected to the circuit board 431, a connector area 450B positioned opposite the board area 450A, and an extension area 450C extending between the board area 450A and the connector area 450B.

The FPCB 451 may include a board portion 451A surrounding at least a portion (e.g., a plurality of side surfaces) of the first carrier 421, and the at least one coil 451B positioned on the board portion 451A and configured to be magnetically or electromagnetically coupled with the first magnet 422. For example, the plurality of coils 451B may be respectively positioned on a first surface (e.g., an inner side surface oriented in the −Y direction) of the board portion 451A, a second surface (e.g., an inner side surface oriented in the +Y direction) opposite to the first surface, and a third surface (e.g., an inner side surface oriented in the −X direction) between the first surface and the second surface.

In one embodiment, the FPCB 451 may include the plurality of coils 451B arranged along the length of the board portion 451A. For example, the plurality of coils 451B may be respectively positioned on a first surface (e.g., an inner side surface oriented in the −Y direction) of the board portion 451A, a second surface (e.g., an inner side surface oriented in the +Y direction) opposite to the first surface, and a third surface (e.g., an inner side surface oriented in the −X direction) between the first surface and the second surface. The coil 451B positioned on the first surface of the board portion 451A may be configured to be electromagnetically coupled with the first magnet 422, the coil 451B positioned on the second surface of the board portion 451A may be configured to be electromagnetically coupled with the third magnet 442B, and the coil 451B positioned on the third surface of the board portion 451A may be configured to be electromagnetically coupled with the second magnet 442A.

In one embodiment, the plurality of coils 451B and the plurality of magnets 422, 442A, and 442B respectively corresponding thereto may be respectively arranged to generate an electromagnetic force (e.g., the Lorentz force). However, embodiments are not limited thereto, and the plurality of coils 451B and the plurality of magnets 422, 442A, and 442B respectively corresponding thereto may be arranged in various forms to generate various types of electromagnetic forces (e.g., the solenoid force).

In one embodiment, the camera module 480 may include a shock absorber 470 configured to absorb a shock transmitted from the second carrier 441 to the first carrier 421. For example, when a disturbance (e.g., vibration) occurs in the camera module 480, the stoppers 444 may meet at least a portion (e.g., the first carrier wall 421A and/or the second carrier wall 421B) of the first carrier 421 to restrict a movement of the second carrier 441, and the shock absorber 470 may substantially block impact transmission paths P1 and P2 along which a shock is transmitted from the stoppers 444 to the guide 423.

In one embodiment, the shock absorber 470 may be provided between the stoppers 444 and the guide 423. In some embodiments, the shock absorber 470 may be provided on the first carrier wall 421A and/or the second carrier wall 421B. In an embodiment, the shock absorber 470 may be provided in the stoppers 444.

In one embodiment, the shock absorber 470 may include a first void portion 471 formed in the first carrier wall 421A. The first void portion 471 may substantially block the first impact transmission path P1 from the stopper bases 444A through the first carrier wall 421A to the guide 423 as the first stopping portions 444B1 meet the first carrier wall 421A.

In one embodiment, the first void portion 471 may be positioned to be spaced apart from the guide 423. For example, the first void portion 471 may be positioned to be spaced apart from the guide 423 along the first carrier wall 421A in a first direction (e.g., the +/−X direction).

In one embodiment, the first void portion 471 may be configured to elastically deform. For example, when the first stopping portions 444B1 strike the first carrier wall 421A, at least a portion of surfaces defining the first void portion 471 may deform such that the impact transmitted along the first impact transmission path P1 may be reduced.

In one embodiment, the first void portion 471 may include a recess 472 formed at least partially in the first carrier wall 421A (e.g., recessed in the −Z direction). The recess 472 may be formed toward the first stopper side surfaces (e.g., the surfaces in the +Y direction) of the stopper bases 444A facing the first carrier wall 421A. In some embodiments, the recess 472 may face a first stopper side surface on which a first stopping portion 444B1 is not provided. In an embodiment, the recess 472 may at least partially face the first stopping portions 444B1.

In one embodiment, the shock absorber 470 may include a second void portion 473 formed in the second carrier wall 421B. The second void portion 473 may substantially block the second impact transmission path P2 from the stopper bases 444A through the second carrier wall 421B to the guide 423 as the second stopping portions 444B2 meet the second carrier wall 421B.

In one embodiment, the second void portion 473 may be positioned to be spaced apart from the guide 423. For example, the second void portion 473 may be positioned to be spaced apart from the guide 423 along the second carrier wall 421B in a second direction (e.g., the +/−Y direction) intersecting with the first direction.

In one embodiment, the second void portion 473 may be configured to elastically deform. For example, when the second stopping portions 444B2 strike the second carrier wall 421B, at least a portion of surfaces defining the second void portion 473 may deform such that the impact transmitted along the second impact transmission path P2 may be reduced.

In one embodiment, the second void portion 473 may penetrate through the second carrier wall 421B. For example, the second void portion 473 may extend between surfaces facing the second stopper side surfaces (e.g., the surfaces in the +X direction) of the second carrier wall 421B and surfaces opposite thereto.

The first camera housing 481 may be configured to at least partially receive the first carrier 421 and the second carrier 441. For example, the first carrier 421 may be positioned inside the first camera housing 481, and the second carrier 441 may be at least partially positioned inside the first carrier 421.

The second camera housing 482 may be configured to at least partially surround the first camera housing 481. The second camera housing 482 may be formed of any appropriate material to have a shielding function.

In one embodiment, the camera module 480 may include a middle guide 485, wherein the middle guide 485 may include a plurality of arms 485A, and a plurality of openings 485B which are positioned in end and joint portions of the plurality of arms 485A and in which the plurality of second balls 443 are at least partially positioned. The middle guide 485 may be positioned between the first carrier 421 and the second carrier 441.

In one embodiment, the camera module 480 may include a stopper frame 486 configured to restrict the movements of the first carrier 421 and the second carrier 441 in one direction (e.g., the +/−Z direction).

Figure 5:
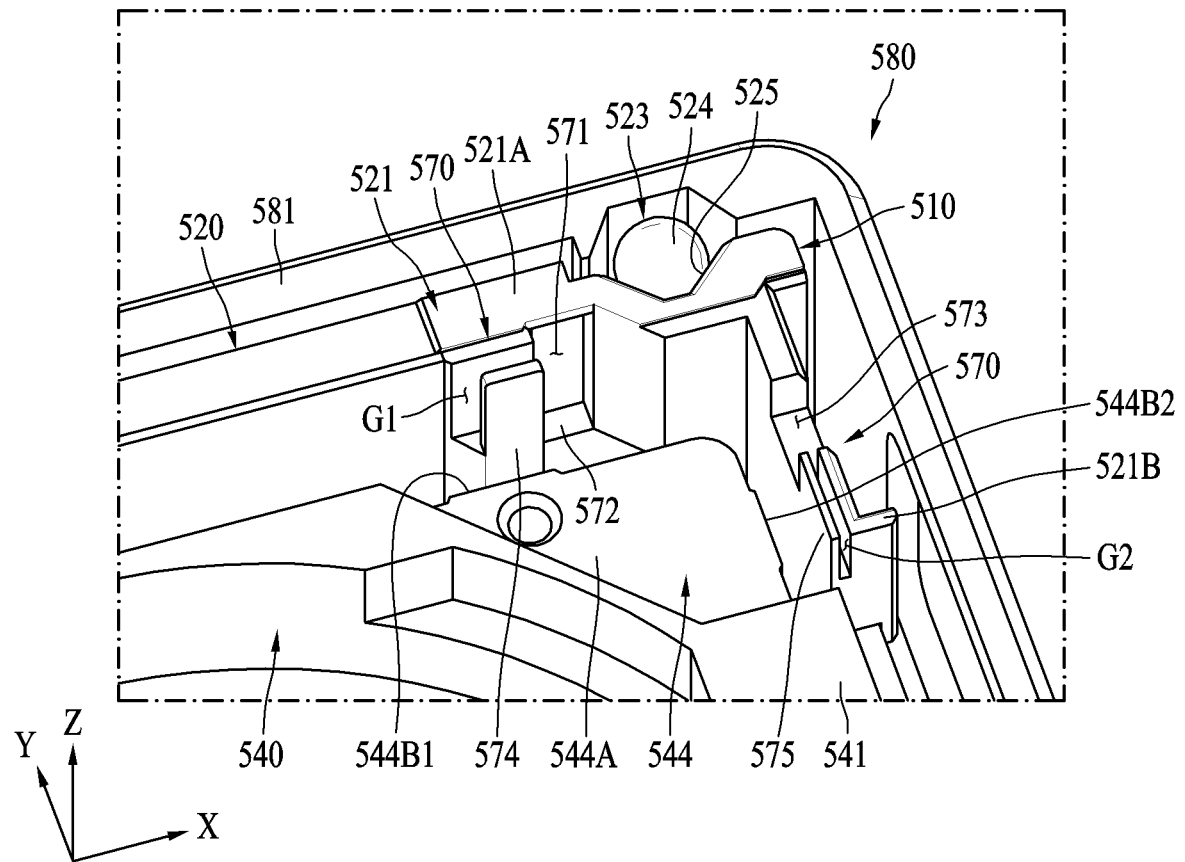
FIG. 5 is an enlarged view of a portion of a camera module according to one embodiment.

FIG. 5 is an enlarged view of a portion of a camera module according to one embodiment.

Referring to FIG. 5, a camera module 580 (e.g., the camera module 480) may include an optical assembly 510 (e.g., the optical assembly 410), a first actuator 520 (e.g., the first actuator 420), a second actuator 540 (e.g., the second actuator 440), a shock absorber 570 (e.g., the shock absorber 470), and a camera housing 581 (e.g., the first camera housing 481).

The optical assembly 510 may include a lens (e.g., the lens 411) and a lens barrel (e.g., the lens barrel 412).

The first actuator 520 may include a first carrier 521 (e.g., the first carrier 421), at least one magnet (e.g., the first magnet 422), and a guide 523 (e.g., the guide 423). The first carrier 521 may include a first carrier wall 521A (e.g., the first carrier wall 421A) and a second carrier wall 521B (e.g., the second carrier wall 421B). The guide 523 may include at least one ball 524 (e.g., the first ball 424) and a guide rail 525 (e.g., the guide rail 425).

The second actuator 540 may include a second carrier 541 (e.g., the second carrier 441), at least one magnet (e.g., the second magnet 442A and the third magnet 442B), at least one ball (e.g., the second ball 443) and a stopper 544 (e.g., the stoppers 444). The stopper 544 may include a stopper base 544A (e.g., the stopper bases 444A), a first stopping portion 544B1 (e.g., the first stopping portions 444B1), and a second stopping portion 544B2 (e.g., the second stopping portions 444B2).

In one embodiment, the shock absorber 570 may include a first void portion 571 (e.g., the first void portion 471). In some embodiments, the first void portion 571 may include a recess 572 (e.g., the recess 472). In an embodiment, the shock absorber 570 may not include the first void portion 571.

In one embodiment, the shock absorber 570 may include a second void portion 573 (e.g., the second void portion 473). In an embodiment, the shock absorber 570 may not include the second void portion 573.

In one embodiment, the shock absorber 570 may include a first flexible flange 574 configured to elastically deform relative to the first carrier wall 521A. The first flexible flange 574 may reduce a shock transmitted from the first stopping portion 544B1 through the first carrier wall 521A to the guide 523.

In one embodiment, the first flexible flange 574 may be positioned to be spaced apart from the guide 523. For example, the first flexible flange 574 may be positioned to be spaced apart from the guide 523 along the first carrier wall 521A in a first direction (e.g., +/−X direction). In some embodiments, the first flexible flange 574 may be positioned such that the first void portion 571 may be formed between the first flexible flange 574 and the guide 523.

In one embodiment, the first flexible flange 574 may be positioned to be spaced apart from the first carrier wall 521A with a first gap G1 with the first carrier wall 521A.

In one embodiment, the first flexible flange 574 may at least partially face the first stopping portion 544B1. In an embodiment, the first flexible flange 574 may face a first stopper side surface (e.g., a surface in a +Y direction) of the stopper base 544A on which the first stopping portion 544B1 is not provided.

In one embodiment, the first flexible flange 574 may be formed integrally and seamlessly with the first carrier wall 521A. In an embodiment, the first flexible flange 574 and the first carrier wall 521A may be connected, joined, or coupled by double injection. For example, the first flexible flange 574 may be formed by inserting a material to form the first flexible flange 574 into at least a portion of the first carrier wall 521A.

In one embodiment, the first flexible flange 574 and the first carrier wall 521A may be formed of the same material. In an embodiment, the first flexible flange 574 and the first carrier wall 521A may be formed of different materials. For example, the first flexible flange 574 may be formed of soft urethane and/or other elastomeric materials. In some embodiments, the first flexible flange 574 may be formed of a more elastic material than the first carrier wall 521A.

In one embodiment, the shock absorber 570 may include a second flexible flange 575 configured to elastically deform relative to the second carrier wall 521B. For example, the second flexible flange 575 may reduce a shock transmitted from the second stopping portion 544B2 through the second carrier wall 521B to the guide 523.

In one embodiment, the second flexible flange 575 may be positioned to be spaced apart from the guide 523. For example, the second flexible flange 575 may be positioned to be spaced apart from the guide 523 along the second carrier wall 521B in a second direction (e.g., +/−Y direction) intersecting with the first direction. In some embodiments, the second flexible flange 575 may be positioned such that the second void portion 573 may be formed between the second flexible flange 575 and the guide 523.

In one embodiment, the second flexible flange 575 may be positioned to be spaced apart from the second carrier wall 521B with a second gap G2 with the second carrier wall 521B. In some embodiments, the second gap G2 may have substantially the same size as the first gap G1. In an embodiment, the second gap G2 may be greater than or smaller than the first gap G1.

In one embodiment, the second flexible flange 575 may at least partially face the second stopping portion 544B2. In an embodiment, the second flexible flange 575 may face a second stopper side surface (e.g., a surface in the +X direction) of the stopper base 544A on which the second stopping portion 544B2 is not provided.

In one embodiment, the second flexible flange 575 may be formed integrally and seamlessly with the second carrier wall 521B. In an embodiment, the second flexible flange 575 and the second carrier wall 521B may be connected, joined, or coupled by double injection. For example, the second flexible flange 575 may be formed by inserting a material to form the second flexible flange 575 into at least a portion of the second carrier wall 521B.

In one embodiment, the second flexible flange 575 and the second carrier wall 521B may be formed of the same material. In an embodiment, the second flexible flange 575 and the second carrier wall 521B may be formed of different materials. For example, the second flexible flange 575 may be formed of soft urethane and/or other elastomeric materials. In some embodiments, the second flexible flange 575 may be formed of a more elastic material than the second carrier wall 521B.

Figure 6A:
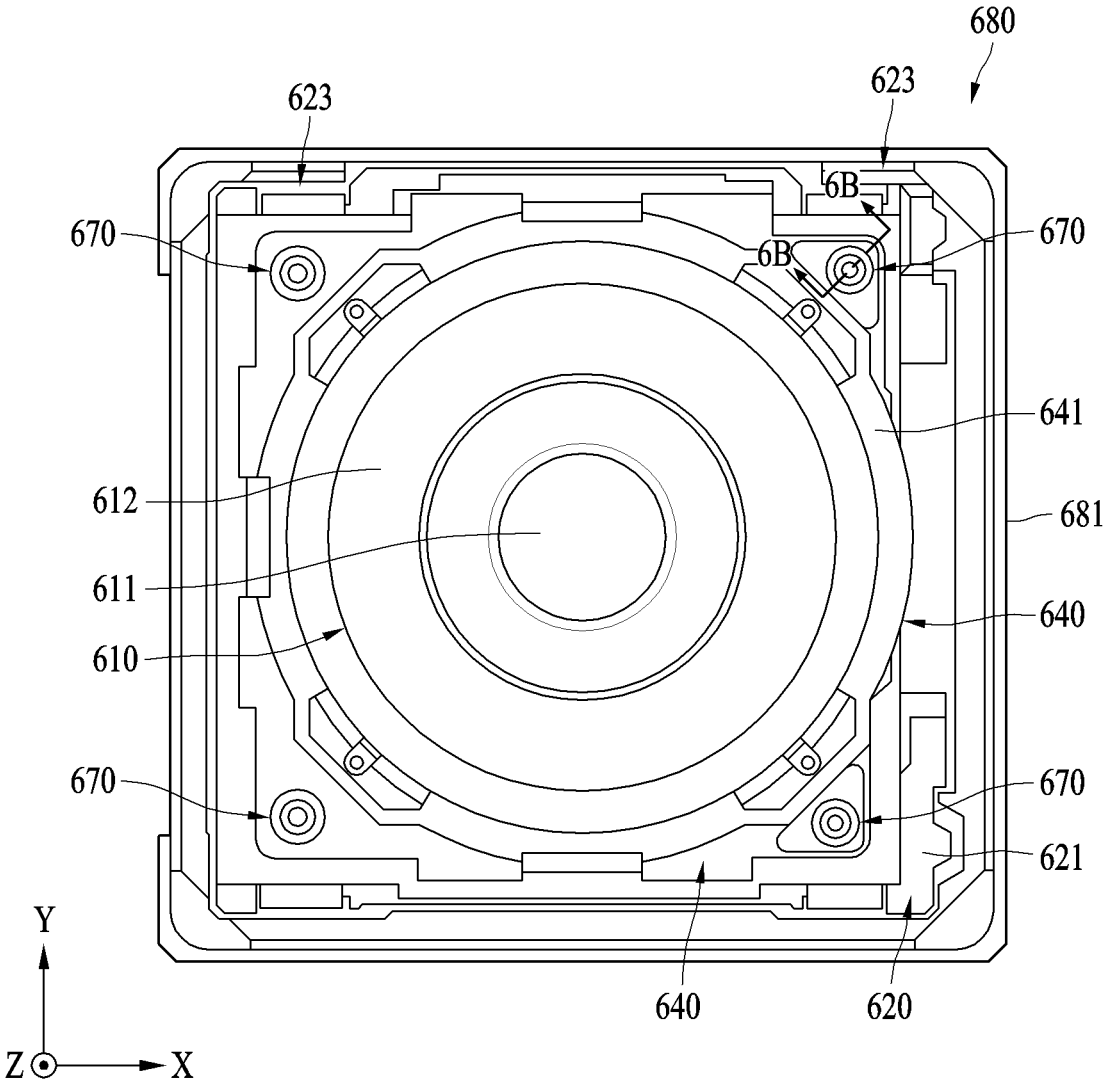
FIG. 6A is a plan view of a camera module according to one embodiment.
Figure 6B:
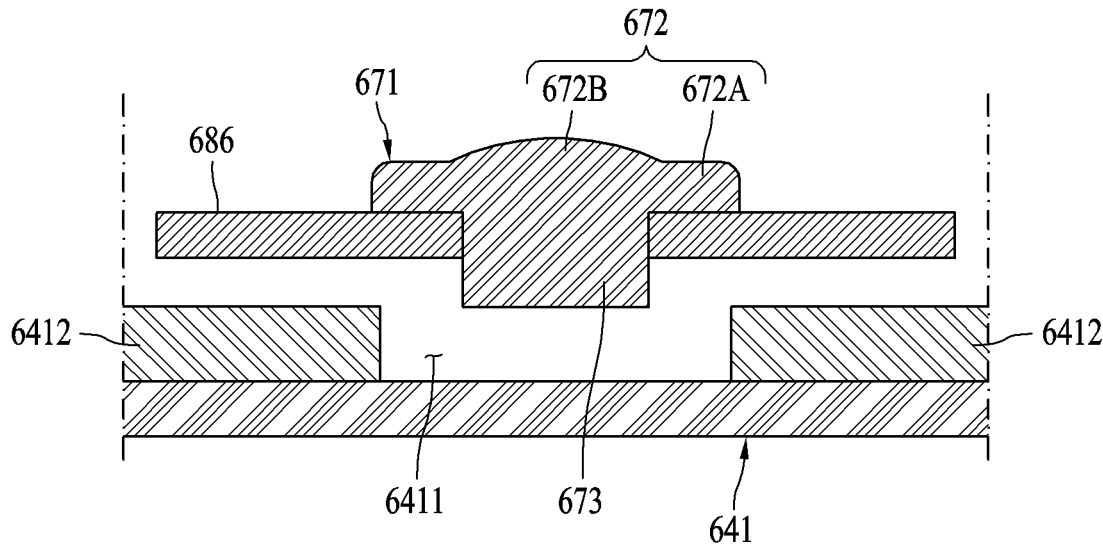
FIG. 6B is a view schematically illustrating a cross-section taken along a line 6B-6B in FIG. 6A.

FIG. 6A is a plan view of a camera module according to one embodiment. FIG. 6B is a view schematically illustrating a cross-section taken along a line 6B-6B in FIG. 6A.

Referring to FIGS. 6A and 6B, a camera module 680 (e.g., the camera module 480) may include an optical assembly 610 (e.g., the optical assembly 410), a first actuator 620 (e.g., the first actuator 420), a second actuator 640 (e.g., the second actuator 440), a shock absorber 670 (e.g., the shock absorber 470), a camera housing 681 (e.g., the first camera housing 481), and a stopper frame 686 (e.g., the stopper frame 486 of FIG. 4B).

The optical assembly 610 may include a lens 611 (e.g., the lens 411) and a lens barrel 612 (e.g., the lens barrel 412).

The first actuator 620 may include a first carrier 621 (e.g., the first carrier 421), at least one magnet (e.g., the first magnet 422), and a guide 623 (e.g., the guide 423). The first carrier 621 may include a first carrier wall (e.g., the first carrier wall 421A) and a second carrier wall (e.g., the second carrier wall 421B). The guide 623 may include at least one ball 524 (e.g., the first ball 424) and a guide rail (e.g., the guide rail 425).

The second actuator 640 may include a second carrier 641 (e.g., the second carrier 441), at least one magnet (e.g., the second magnet 442A and the third magnet 442B), at least one ball (e.g., the second ball 443) and a stopper (e.g., the stoppers 444).

In one embodiment, the shock absorber 670 may include at least one damper 671 configured to damp between one surface (e.g., a surface in the −Z direction or a bottom surface) of the stopper frame 686 (e.g., the stopper frame 486) and one surface (e.g., a surface in the +Z direction or a top surface) of the second carrier 641. The damper 671 may be positioned in an area corresponding to a corner area of the first carrier 621 among areas of the stopper frame 686. For example, the damper 671 may directly contact the second carrier 641, thereby reducing a shock transmitted from the second carrier 641 through the stopper frame 686 to the guide 623.

In one embodiment, the damper 671 may include a flange portion 672 positioned on one surface (e.g., the surface in the +Z direction or the top surface) of the stopper frame 686, and a shaft portion 673 connected to the flange portion 672, at least partially penetrating through the stopper frame 686, and at least partially positioned in a partial area (e.g., a recessed area 6411 defined by protruding areas 6412) of the second carrier 641. In some embodiments, the flange portion 672 may include an expanded portion 672A expanding along one surface of the stopper frame 686, and a convex portion 672B formed to be substantially convex from the expanded portion 672A. In one embodiment, the shaft portion 673 may act as a stopper that directly contacts at least one protruding area 6412 and restricts a movement (e.g., a movement in the +/−X direction and/or a movement in the +/−Y direction) of the second carrier 641.

In one embodiment, the flange portion 672 and the shaft portion 673 may be seamlessly and integrally formed. In an embodiment, the flange portion 672 and the shaft portion 673 may be formed of different materials (e.g., by double injection).

In one embodiment, the flange portion 672 and/or the shaft portion 673 may be formed of an elastically deformable material. For example, the flange portion 672 and/or the shaft portion 673 may be formed of an elastomeric material.

In one embodiment, the recessed area 6411 may be formed as an empty space that is not filled with another material. In an embodiment, the recessed area 6411 may be filled with a fluid material. For example, the fluid material may include a gel-type material. The shaft portion 673 may be damped by the fluid material, whereby a shock transmitted from the second carrier 641 to the guide 623 may be reduced.

A shock on a camera module may cause damage to components associated with the camera module, consequently reducing the autofocus performance. An aspect of the disclosure may provide a camera module that reduces a shock transmitted to an actuator.

According to one embodiment, a camera module 480 may include an optical assembly 410, a first actuator 420 configured to actuate the optical assembly 410 in a first direction (e.g., +/−Z direction), the first actuator 420 including a first carrier 421, a guide 423 configured to guide the first carrier 421, and a shock absorber 470 provided in the first carrier 421 and configured to reduce a shock transmitted to the guide 423, and a second actuator 440 configured to actuate the optical assembly 410 in a second direction (e.g., a tangential direction of a XY plane) different from the first direction, the second actuator 440 including a second carrier 441 spaced apart from the first carrier 421, and a stopper 444 provided in the second carrier 441 and configured to restrict a movement of the second carrier 441, wherein the shock absorber 470 may be provided between the guide 423 and the stopper 444.

In one embodiment, the first carrier 421 may include a first carrier wall 421A facing a first stopper side surface of the stopper 444, and the shock absorber 470 may include a first void portion 471 formed in the first carrier wall 421A.

In one embodiment, the first void portion 471 may be positioned to be spaced apart from the guide 423.

In one embodiment, the first void portion 471 may be configured to at least partially elastically deform.

In one embodiment, the first void portion 471 may include a recess 472 at least partially formed in the first carrier wall 421A.

In one embodiment, the first carrier 421 may further include a second carrier wall 421B that intersects with the first carrier wall 421A and faces a second stopper side surface intersecting with the first stopper side surface of the stopper 444, and the shock absorber 470 may further include a second void portion 473 formed in the second carrier wall 421B.

In one embodiment, the second void portion 473 may penetrate through the second carrier wall 421B.

In one embodiment, the stopper 444 may be spaced apart from the first carrier 421.

In one embodiment, the camera module 480 may further include a camera housing 481 configured to receive the first carrier 421 and the second carrier 441, wherein the guide 423 may be positioned between the camera housing 481 and the first carrier 421.

In one embodiment, the guide 423 may include at least one ball 424.

In one embodiment, the first carrier 521 may include a first carrier wall 521A facing a first stopper side surface of the stopper 544, and the shock absorber 570 may include a first flexible flange 574 provided on the first carrier wall 521A and configured to elastically deform relative to the first carrier wall 521A.

In one embodiment, the first flexible flange 574 may be provided seamlessly and integrally with the first carrier 521.

In one embodiment, the first flexible flange 574 may be connected to the first carrier 521 so as to be inserted into at least a portion of the first carrier 521.

In one embodiment, the first flexible flange 574 may be formed of a more elastic material than the first carrier 521.

In one embodiment, the first carrier 521 may further include a second carrier wall 521B that intersects with the first carrier wall 521A and faces a second stopper side surface intersecting with the first stopper side surface of the stopper 544, and the shock absorber 570 may further include a second flexible flange 575 provided on the second carrier wall 521B and configured to elastically deform relative to the second carrier wall 521B.

According to one embodiment, an electronic device 201 may include a housing 210 and a camera module 280a, 280b, 480 positioned in the housing 210, wherein the camera module 280a, 280b, 480 may include an optical assembly 410, a first actuator 420 configured to actuate the optical assembly 410 in a first direction (e.g., +/−Z direction), the first actuator 420 including a first carrier 421, a guide 423 configured to guide the first carrier 421, and a shock absorber 470 provided in the first carrier 421 and configured to reduce a shock transmitted to the guide 423, and a second actuator 440 configured to actuate the optical assembly 410 in a second direction (e.g., a tangential direction of a plane substantially formed by +/−X direction and +/−Y direction) different from the first direction, the second actuator 440 including a second carrier 441 spaced apart from the first carrier 421, and a stopper 444 provided in the second carrier 441 and configured to restrict a movement of the second carrier 441, wherein the shock absorber 470 may be provided between the guide 423 and the stopper 444.

In one embodiment, the first carrier 421 may include a first carrier wall 421A facing a first stopper side surface of the stopper 444, and the shock absorber 470 may include a first void portion 471 formed in the first carrier wall 421A.

In one embodiment, the first void portion 471 may be positioned to be spaced apart from the guide 423.

In one embodiment, the first void portion 471 may be configured to at least partially elastically deform.

In one embodiment, the first void portion 471 may include a recess 472 at least partially formed in the first carrier wall 421A.

According to one embodiment, it is possible to reduce damage (e.g., a dent) to components occurring when an external force (e.g., vibration) is introduced to a camera module, thereby enhancing the autofocus function. The effects of the electronic device according to one embodiment are not limited to the above-mentioned effects, and other unmentioned effects can be clearly understood from the detailed description by one of ordinary skill in the art.

Features and aspects of the above described embodiments can be combined unless their combining results in evident technical conflicts.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A camera module, comprising:
an optical assembly including a lens having an optical axis;
a first actuator configured to actuate the optical assembly in a first direction that is substantially parallel to the optical axis, the first actuator comprising a first carrier, a guide configured to guide the first carrier, and a shock absorber provided in the first carrier; and
a second actuator configured to actuate the optical assembly in a second direction orthogonal to the first direction that is substantially parallel to the optical axis, the second actuator comprising a second carrier spaced apart from the first carrier, and a stopper provided in the second carrier and configured to restrict a movement of the second carrier,
wherein the shock absorber is provided between the guide and the stopper,
wherein the guide comprises at least one first ball and a guide rail along which the at least one first ball moves, and
wherein the shock absorber comprises a first void portion in the first carrier configured to reduce an impact transmitted from the second carrier to the guide.

2. The camera module of claim 1,
wherein the first carrier comprises a first carrier wall facing a first stopper side surface of the stopper.

3. The camera module of claim 2,
wherein the first void portion is positioned to be spaced apart from the guide.

4. The camera module of claim 2,
wherein the first void portion is configured to at least partially elastically deform.

5. The camera module of claim 2,
wherein the first void portion comprises a recess at least partially formed in the first carrier wall.

6. The camera module of claim 2, wherein the first carrier further comprises a second carrier wall that intersects with the first carrier wall and faces a second stopper side surface intersecting with the first stopper side surface of the stopper, and wherein the shock absorber further comprises a second void portion formed in the second carrier wall.

7. The camera module of claim 6, wherein the second void portion penetrates through the second carrier wall.

8. The camera module of claim 1, wherein the stopper is spaced apart from the first carrier.

9. The camera module of claim 1, further comprising:

a camera housing configured to receive the first carrier and the second carrier, wherein the guide is positioned between the camera housing and the first carrier.

10. The camera module of claim 1, wherein the guide comprises at least one ball.

11. The camera module of claim 1, wherein the first carrier comprises a first carrier wall facing a first stopper side surface of the stopper, and wherein the shock absorber comprises a first flexible flange provided on the first carrier wall and configured to elastically deform relative to the first carrier wall.

12. The camera module of claim 11, wherein the first flexible flange is provided seamlessly and integrally with the first carrier.

13. The camera module of claim 11, wherein the first flexible flange is connected to the first carrier so as to be inserted into at least a portion of the first carrier.

14. The camera module of claim 13, wherein the first flexible flange is formed of a more elastic material than the first carrier.

15. The camera module of claim 11, wherein the first carrier further comprises a second carrier wall that intersects with the first carrier wall and faces a second stopper side surface intersecting with the first stopper side surface of the stopper, and wherein the shock absorber further comprises a second flexible flange provided on the second carrier wall and configured to elastically deform relative to the second carrier wall.

16. An electronic device, comprising:

a housing; and a camera module positioned in the housing, wherein the camera module comprises:

an optical assembly including a lens having an optical axis, a first actuator configured to actuate the optical assembly in a first direction that is substantially parallel to the optical axis, the first actuator comprising a first carrier, a guide configured to guide the first carrier, and a shock absorber provided in the first carrier, and a second actuator configured to actuate the optical assembly in a second direction orthogonal to the first direction that is substantially parallel to the optical axis, the second actuator comprising a second carrier spaced apart from the first carrier, and a stopper provided in the second carrier and configured to restrict a movement of the second carrier, wherein the shock absorber is provided between the guide and the stopper, wherein the guide comprises at least one first ball and a guide rail along which the at least one first ball moves, and wherein the shock absorber comprises a first void portion in the first carrier configured to reduce an impact transmitted from the second carrier to the guide.

17. The electronic device of claim 16, wherein the first carrier comprises a first carrier wall facing a first stopper side surface of the stopper.

18. The electronic device of claim 17, wherein the first void portion is positioned to be spaced apart from the guide.

19. The electronic device of claim 17, wherein the first void portion is configured to at least partially elastically deform.

20. The camera module of claim 17, wherein the first void portion comprises a recess at least partially formed in the first carrier wall.

\* \* \* \* \*